UNITED STATES PATENT OFFICE.

ROBERT WAHL, OF CHICAGO, ILLINOIS, ASSIGNOR, BY MESNE ASSIGNMENTS, TO LUPULYTIC PROCESS COMPANY, OF CHICAGO, ILLINOIS, A CORPORATION OF ILLINOIS.

PROCESS OF MANUFACTURING HOPPED BEVERAGES.

1,149,704.  Specification of Letters Patent.  Patented Aug. 10, 1915.

No Drawing.  Application filed September 3, 1914. Serial No. 860,075.

*To all whom it may concern:*

Be it known that I, ROBERT WAHL, a citizen of the United States, residing at Chicago, in the county of Cook and State of Illinois, have invented a new and useful Improvement in Processes of Manufacturing Hopped Beverages, of which the following is a specification.

The valuable constitutents of hops for hopping beverages, such as beer, are those which impart thereto a bitter taste, coming from the bitter principle in the hops, and lend to the beverage its characteristic hop flavor. This bitter principle resides in the hop resins, now usually termed "hop-bitter acids" in the technical literature relating to hops; and these acids are of importance, besides in checking the growth of foreign fermentation in beer and are, therefore, of value in stabilizing the beverage.

The object of my invention is to provide an improved process of extracting these hop-bitter acids, thereby to cause their extremely minute division in colloidal form when added to the wort or beer in the course of manufacturing the latter.

As is known in the art, the aforesaid constituents of hops are largely insoluble in water, while they dissolve readily in such solvents as ether, petroleum ether and alcohol, as also in water solutions of caustic alkalis and alkaline carbonates; and by employing either of these forms of alkali to produce a solution of the aforesaid valuable constituents of hops, their practically complete precipitation is effected by acidifying the solution. It is further made known in United States Letters Patent No. 978,476, dated December 13, 1910, to Arvid Nilson for a hop-extraction process, that hop-resins or hop-bitter acids may be extracted by means of ammonia and the bitter principle precipitated by acidification, and that the precipitate, consisting almost entirely of these resinous constituents of the hops, with only a small percentage of albumen, may be employed in the same manner that lupulin is used in brewery practice, namely by simply adding it to the wort. I have discovered that by dissolving the hop-bitter acids or the lupulin of hops with caustic soda, or some other alkali, this hop-bitter principle will be thrown out of its solution in a colloidal form, or very finely divided state, and remain, for all practical purposes, permanently in such colloidal state, if the solution be introduced into a liquid containing acid in very dilute form and the volume of such liquid be large compared with the quantity of the hop-bitter acid so introduced, by the acid-content of the liquid neutralizing the alkali. On the other hand, if the volume of the acid-containing liquid, in which neutralization of the acid takes place, be relatively small, the hop-bitter acids, or hop-resins, being of a sticky nature, will cause what is known as pectization (flocculation) with accompanying separation from the liquid holding the fine suspension or gel. Conditions favorable to causing such ultra fine distribution of alkali-dissolved hop-bitter acids through the medium of a dilute acid liquid exist in brewers' wort in which there is sufficient acidity combined with sufficient volume to effect such neutralization and resultant fine division, which is comparable to the division or distribution of fat globules in milk, or in an emulsion, or to the distribution of particles like silicic acid in a hydrosol or an alcosol. The result is analogous to that which is obtained in the case of silicic acid by adding an alkali-solution of it (produced with a small quantity of alkali) to a watery solution of hydrochloric acid, when this solution is of sufficient volume. The fine distribution of the hop-resin throughout wort may be best effected while the wort is boiling in the hop kettle, the natural lactic acid and acid phosphates contained in the wort, serving to neutralize the alkali which is combined with the hop-bitter acids and thereby throwing them out in a condition of extremely minute division to uniformly and quickly ditribute them through the wort.

It is preferred to use only that part of the hops, for dissolving in the caustic alkali solution, which is obtained by mechanical separation of the disintegrated hop-cones, by screening from the stems and cone leaves. This may be obtained, in the manner customarily practised in modern brewery operations, by the employment of a so-called hop separator, the action of which is to separate, by agitation, the stems from the leaves; and during the agitation most of the lupulin, which contains the hop resins, is separated from the leaves and may be obtained mixed with more or less of the particles of hop-leaves which have been disintegrated by the tearing action of the separator. Ordinarily, the amount of crude lupulin thus obtained is about 10 to 15 pounds from 100 pounds of hops; and about 1½ to 2 pounds of caustic soda are required to dissolve that quantity of lupulin. The process of dissolving this lupulin with caustic soda, soda ash, or other caustic alkali, may be practised in a simple receptacle set above the hop-kettle. Into this receptacle are introduced for, say, a 100-barrel brew, about 10 lbs. of the crude lupulin together with about 20 gallons of hot water or spargings and about 2 lbs. of the caustic substance dissolved in water; the solution being kept at a temperature of about 180° F. The mixture is then thoroughly stirred, and is allowed to stand for about one hour, when the extraction will be completed. The contents of the receptacle are thereupon emptied into the hop-kettle at the proper time, say from 5 to 15 minutes before the wort is to be run out; or they may be run into the hop-jack. In this manner, the hop resins, or that portion which was separated from the hops, and hereinbefore called crude lupulin, are practically all extracted and there is no loss of lupulin, as there is under present usual brewery practices, whereby most of the hop resin is admittedly lost.

Where no hop separator is available, the entire hops may be used for extraction, though that is not so desirable, since then a larger quantity of the caustic alkali must be used and the hops, to thoroughly extract them, must be placed in a separate extractor equipped with stirring apparatus and the entire contents of such extractor emptied into the kettle at the proper time.

By the improved process, thus described, a saving of fully 15 per cent. of the amount of hops ordinarily employed in the manufacture of beer is effected, and the resulting beer is in every way at least equal in quality to that brewed with the larger quantity of hops. In one brewery the brew was carried out, according to the present process, through 14 successive working days, each brew consisting of 390 barrels employing 170 lbs. of hops, prepared as herein described, as against 205 lbs. of hops employed in the regular way. Moreover, as is well known, spent hops taken from the hop-jack, when extracted with ether, yield considerable quantities of hop resin, while when the hops have been treated according to the present process, the spent hops contain only traces of hop resin.

It is to be understood as within my invention to add the caustic solution of hop-bitter acids to the beer during or after fermentation, which produces advantages about equally as great as adding the same to the wort.

What I claim as new and desire to secure by Letters Patent is:—

1. In the manufacture of hopped beverages, the process of distributing the hop-bitter acids in colloidal form throughout the acid-containing liquid under treatment, which consists in treating the hops with a caustic alkali solution, thereby dissolving and extracting the hop-bitter acids, adding the hops in the solution used for their extraction to said liquid, and causing the acid of the latter to neutralize the alkali.

2. In the manufacture of hopped beverages, the process of distributing the hop-bitter acids in colloidal form throughout the acid-containing liquid under treatment, which consists in treating the hops with a dilute solution of caustic alkali at a temperature of about 180° F., thereby dissolving and extracting the hop-bitter acids, adding the hops in the solution used for their extraction to said liquid, and causing the acid of the latter to neutralize the alkali.

3. In the manufacture of beer, the process which consists in preparing a dilute solution of caustic soda, mixing therewith hops in the proportion, by weight, of 1 part of the hops to about 20 parts, as the maximum, of the solution and maintaining the solution at a temperature of about 180° until the hop-bitter acids have been thoroughly dissolved and extracted, then introducing into the wort the hops in the solution used for their extraction, thereby distributing said hop-bitter acids in a colloidal form throughout the wort and neutralizing by the acid of the latter the alkali in the solution.

ROBERT WAHL.

In presence of—
A. C. FISCHER,
L. HEISLAR.

Copies of this patent may be obtained for five cents each, by addressing the "Commissioner of Patents, Washington, D. C."